Patented June 26, 1928.

1,674,802

UNITED STATES PATENT OFFICE.

TAISAN SHIGA, OF TOKYO, JAPAN.

FIREPROOF AND ANTIROTTING COMPOSITION.

No Drawing. Application filed November 1, 1926, Serial No. 145,593, and in Japan July 17, 1926.

My invention relates to a fireproof and anti-rotting composition consisting of a slightly acid solution of magnesium borate, ammonium sulphate and sodium cresate, and has for its object to provide an agent adapted to impregnate timbers, papers, woven goods and the like, and the articles made therefrom, to render them fireproof and anti-rotting, and to secure their preservation for a long time.

A further object of my invention is to obtain a composition which contains the said three agents, by first making ammonium sulphate and magnesium borate without using either borax or ammonium sulphate, but by means of a special process disclosed hereafter, and then by adding acetic acid and sodium cresate to the mixed solution.

It is well known that magnesium borate and ammonium sulphate have a remarkable fireproof power, and that sodium cresate has a remarkable anti-rotting power, but till now a composition consisting of the above three agents has never been used for fireproofing and anti-rotting purposes.

In case magnesium borate is to be used as a fireproof agent, a mixture of a solution of borax and a solution of magnesium sulphate has usually been used hitherto. This mixture practically consists of magnesium borate and sodium sulphate, and produces a crystalline precipitate of magnesium borate, readily upon the application of heat, and after several hours even in the cold state, so that practically it is impossible to use the mixture; and not only that, but the mixture has also the defect that a large quantity of unnecessary sodium sulphate is contained in it.

My process consists in first making a mixture of ammonium sulphate and magnesium hydroxide by adding ammonia water to a solution of the magnesium sulphate, and then converting magnesium hydroxide thus produced into magnesium borate by adding a solution of boric acid to the said mixture.

Thus a mixture of ammonium sulphate and magnesium borate, which contains no other unnecessary materials, such as sodium sulphate, is obtained from the above three chemicals: viz, magnesium sulphate, ammonia water and boric acid. This is the first special feature in my invention.

The mixture contains at first magnesium borate in the precipitated condition, but it is changed into a clear solution on dissolving the precipitate by adding a somewhat large quantity of boric acid and a little acetic acid to it. This is the second special feature of my invention.

Sodium cresate is then added to the mixture; which should remain clear by keeping it always slightly acid by the addition of acetic acid. This is the third special feature of my invention.

It will be seen that the composition thus prepared according to my invention acts very efficiently both as a fireproof and anti-rotting agent, as it contains the three necessary ingredients of magnesium borate, ammonium sulphate and sodium cresate.

The quantities of each ingredient in my composition may be varied advantageously according to whether the mixture is to be used for fireproofing or anti-rot, and further according to the nature of the material to which the mixture is to be applied. For example, 100 parts by weight of a solution of magnesium sulphate dissolved in two times its weight of water are mixed with 45 parts by weight of 10% ammonia water and stirred, and after setting aside for several hours, 12 parts by weight of a solution of boric acid dissolved in 96 parts by weight of water is added to the mixture and stirred, and then 40 parts by weight of dilute acetic acid (glacial acetic acid dissolved in four times its weight of water) is added to it and then is slowly mixed with 40 parts by weight of 15% solution of sodium cresate. If boric acid is added in excess, the addition of acetic acid may be omitted. Instead of acetic acid, other acids or acid salts, having more or less fireproofing properties may be used, the essential point is that the mixture must be kept always acid, so that sodium cresate is easily dissolved. Instead of sodium cresate cresate may be used just as well.

In applying the above composition for practical use, it may be coated on the material or the article, or the latter may be soaked in it, or it may be put into an impregnating can, which contains the mixture and is evacuated and moreover a certain pressure may be applied in addition.

The material or the article treated as above described remains quite unchanged on touching with a flame, and does not practically burn by any means, even if it is placed in the flame for a long time, except that only the surface of the portion touched by the flame becomes slightly black, and accordingly is in no danger of fire, and also does not rot for a long time.

Having now particularly described and ascertained the nature of the said invention, and in what manner the same is to be performed, I declare that what I claim is:—

The process of preparing a fireproofing and anti-rotting solution which comprises adding ammonia water to a solution of magnesium sulphate, mixing the resulting solution with a solution of boric acid and adding acetic acid and sodium cresate thereto.

In testimony whereof I affix my signature.

TAISAN SHIGA.